US007761873B2

(12) United States Patent
Hahn et al.

(10) Patent No.: US 7,761,873 B2
(45) Date of Patent: Jul. 20, 2010

(54) USER-SPACE RESOURCE MANAGEMENT (75) Inventors: Stephen C. Hahn, Redwood City, CA (US); Jeffrey Rhyason, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1268 days.

(21) Appl. No.: 10/726,948

(22) Filed: Dec. 2, 2003

(65) Prior Publication Data

US 2004/0117540 A1 Jun. 17, 2004

Related U.S. Application Data (60) Provisional application No. 60/430,897, filed on Dec. 3, 2002.

(51) Int. Cl.
*G06F 9/46* (2006.01)
*G06F 13/00* (2006.01)
*G06F 13/28* (2006.01)

(52) U.S. Cl. .......................... 718/100; 711/100
(58) Field of Classification Search ................. 718/104; 707/206; 709/226
See application file for complete search history.

(56) References Cited

U.S. PATENT DOCUMENTS 4,912,629 A * 3/1990 Shuler, Jr. ................. 707/206
7,433,951 B1 * 10/2008 Waldspurger, Carl A. ... 709/226

OTHER PUBLICATIONS

Unknown, "*Solaris Resource Manager™ 1.1 White Paper*", Sun Software White Papers, Sep. 1999, XP002290899, pp. 1-18, www.sun.com/software/whitepapers/wp-srmll/srmllwp.pdf>.

Unknown, *Solaris 9 Resource Manager Software, A Technical White Paper*, Sun Software White Papers, Jun. 3, 2002, XP002291080, www.sun.com/software/whitepapers/solaris9/srm.pdf>.

Uri, "*Workload management-many questions*", IT Resource Center Forums, Jul. 10, 2002, XP002290900, pp. 1-4, http://forums1.itrc.hp.com/service/forums/questionanswer.do?admit+716493758+1091180233157+28353475&threadId+25550>.

Tanenbaum, "*Modern Operating Systems, $2^{nd}$ Edition*", 2001, Prentice Hall Intl, New Jersey, XP002290901.

Unknown, "*Solaris [TM] 9 Resource Manager Software, A Technical White Paper*", Sun Systems, vol. 52, No. 1, Jun. 3, 2002, XP002291081, http://sun.systemnews.com/fullsource?article+6750>.

\* cited by examiner

*Primary Examiner*—Meng-Ai An
*Assistant Examiner*—Eric C Wai
(74) *Attorney, Agent, or Firm*—Marsh Fischmann & Breyfogle LLP; Kent A. Lembke; Jonathon A. Szumny (57) ABSTRACT

Systems and methods of user-space resource management. Resource usage of a workload is monitored outside of an operating system space. Alternatively, resource usage of a workload can be monitored from within the workload. A resource monitor scans a plurality of workloads to determine if a workload exceeds a resource capacity limit. The resource monitor can also determine if a workload exceeds a threshold limit that is less than the resource capacity limit. The resource monitor can initiate a process in user space to reduce the workload's resource usage. Monitoring resource usage from outside of an operating system space enables optimization of computing resources dedicated to resource usage monitoring. In a virtual memory operating system, a user-space resource monitor can perform selection of pages for paging.

12 Claims, 7 Drawing Sheets

USER-SPACE RESOURCE MANAGEMENT

RELATED APPLICATIONS

This Application claims the benefit of U.S. Provisional Application Ser. No. 60/430,897, filed Dec. 3, 2002, entitled "Agent LWP-Based Memory Reservation Management Daemon," which is hereby incorporated herein by reference in its entirety.

Co-pending, commonly-owned U.S. patent application Ser. No. 09/930,807, filed Aug. 15, 2001, entitled "Methods and Apparatus for Managing Defunct Processes," to Price and Faulkner, is hereby incorporated herein by reference in its entirety.

Commonly-owned U.S. Pat. No. 6,002,870, issued Dec. 14, 1999, entitled "Method and Apparatus for Non-Damaging Process Debugging via an Agent Thread," to Faulkner and Marsland, is hereby incorporated herein by reference in its entirety.

BACKGROUND

The terms "storage" and "memory" are generally understood to refer to or to describe those elements of a computer system that retain information. "Physical memory" generally describes high-speed, relatively expensive devices having a relatively small capacity that are typically (but not always) volatile. In contrast, "storage" refers to devices that are typically slower, less expensive (per unit capacity) and have larger capacity than memory devices, and are generally non-volatile. The term "memory" is also commonly used to refer to computing system resources that are utilized in the same manner as, or for similar functions to, physical memory.

In general, in a virtual memory system, the operating system manages memory as a resource, providing a virtual or idealized view of memory to the non-system level software, for example a user program. In this manner, the user program may be isolated from the myriad physical details of the actual memory implementation, and allows an operating system to better utilize scarce computer system resources.

Consequently, when a user program accesses "memory," the operating system translates the request from a virtual address to a physical address, which is mapped to physical memory. Additionally, in many virtual memory systems, all virtual memory addresses may not directly translate to physical memory, but may translate to storage as well. The operating system may present a virtual image of memory that is larger than the physical memory. The operating system typically will divide memory, both physical and virtual, into pages. Through a process known as paging, the operating system may move virtual pages in and out of physical memory, generally storing pages taken out of physical memory to a storage device. Consequently, the virtual memory system takes on the complexity of managing an effectively unlimited amount of virtual memory, simplifying and enabling user software to use large amounts of virtual memory when necessary.

For the most part, a program, or program segment, must be located in physical memory in order to execute. Copying information from storage into physical memory is a very slow process in comparison to accessing information from physical memory. Consequently, it is highly desirable to have information, e.g., computer instructions, application data and other information, available in physical memory when needed. However, physical memory is typically a limited resource, and it is common for active processes in a computer system to demand, in aggregate, more virtual memory than is available in the form of physical memory on the computer system.

A request, e.g., from a computer program, for more physical memory than is currently available, is generally referred to as "over committing," or an "overcommit." In response to an overcommit, a virtual memory system will typically select a portion of physical memory utilized by one or more other workloads or processes, e.g., a number of pages, to copy or "page out" to storage, freeing physical memory for the requestor that initiated the overcommit.

The term "workload" is generally used to refer to or to describe a process, or group of processes, assigned a common set of computing resources, e.g., a set of physical and/or virtual memory pages. A workload can correspond to a single user in a multi-user system. A workload can correspond to an application program. Child processes are generally in the same workload as the spawning process. Elements of a workload are typically related, e.g., application programs and other processes acting upon a common database, but they need not be.

When total physical memory requirements exceed the amount of physical memory available on a computer system, a typical operating system response is to copy some portion of physical memory to storage, thus freeing up the previously used physical memory for another use. This process is generally known as paging, or paging out memory. A computer process losing physical memory due to such paging is often referred to as a "victim" or victim process, and is said to be "victimized" by the paging.

The selection of which workload memory elements resident in physical memory, typically referred to as pages, should be paged, and consequently which processes or workloads are victimized, can have great implications on the performance of a computer system. As such, there has been a great deal of effort devoted to improving selection methods and there are numerous implementations of such methods. A first conventional method for selecting memory to be paged out comprises an operating system selecting least recently used page(s) of memory from throughout the entire computer system.

Other conventional methods of selecting pages for paging set limits on the amount of physical memory allocated to each workload. Such methods attempt to victimize a given workload when it exceeds its physical memory allocation. One conventional method in this category halts execution of a workload when it exceeds its memory allocation. Over time, the physical memory assigned to the workload will become the least recently used memory in the system, the pages will be paged out and the memory assigned to the workload will be "flushed" out. Eventually, the workload begins to be paged back in.

Another conventional method of selecting pages for paging selects pages from a given workload when it exceeds its memory allocation. This method is generally implemented as an operating system kernel process. Operating system kernel processes can be very expensive in terms of computing load on a system, as they execute very frequently in comparison to non-kernel processes. Consequently, it is generally necessary to limit such methods to monitoring a very few processes. In general, all processes of such a system are not monitored for such specific victimization. For example, processes may be combined for the purposes of monitoring and controlling memory usage, in order to limit the number of entities monitored.

SUMMARY

Systems and methods of user-space resource management are disclosed. Resource usage of a workload is monitored outside of an operating system space. Alternatively, resource usage of a workload can be monitored from within the workload. A resource monitor scans a plurality of workloads to determine if a workload exceeds a resource capacity limit. The resource monitor can also determine if a workload exceeds a threshold limit that is less than the resource capacity limit. The resource monitor can initiate a process in user space to reduce the workload's resource usage. Monitoring resource usage from outside of an operating system space enables optimization of computing resources dedicated to resource usage monitoring. In a virtual memory operating system, a user-space resource monitor can perform selection of pages for paging.

In accordance with embodiments of the present invention, resources monitored from a workload space can comprise physical memory.

In accordance with another embodiment of the present invention, a user-space resource monitor can select memory pages least recently used by the workload for paging out of physical memory.

In accordance with yet another embodiment of the present invention, a user-space resource monitor can initiate a process from within the workload to page out selected physical memory pages.

DETAILED DESCRIPTION OF EMBODIMENTS OF THE INVENTION

In the following detailed description of embodiments in accordance with the present invention, user-space resource management, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., methods 200, 300, 400, 500 and 600) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "selecting" or "initiating" or "indexing" or "processing" or "computing" or "paging" or "determining" or "decreasing" or "displaying" or "recognizing" or "generating" or "identifying" or "executing" or "determining" or "monitoring" or "running" or "making" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

User-Space Resource Management

Embodiments in accordance with the present invention are described in the context of a general purpose computer system. However, it is to be appreciated that the present invention may be utilized in other types of computer systems utilizing virtual memory techniques.

The term "resource cap" is generally used to refer to or to describe an upper bound or limit placed upon resource consumption for some computer system resource. The term computer system resource generally refers to aspects of a computer system, e.g., physical memory, virtual memory, central processing unit (CPU) time, input/output (I/O) space or network bandwidth and the like that are controlled by an operating system. A resource cap is generally applied to a workload. A resource cap represents a quantity of such resource that, when exceeded by the aggregate amount consumed by the associated workload, represents a condition of over consumption of the resource(s) by the workload. Exceeding a resource cap can trigger actions by the operating system, e.g., responding to a system call, to reduce consumption of the resource(s) to below the resource cap level. Alternatively, all actions for enforcing a resource cap can be in user space.

It is to be appreciated that embodiments of the present invention may be practiced on a wide variety of computer systems, comprising a variety of processors and operating systems. For example, embodiments in accordance with the present invention can be practiced on "x86" compatible computer systems, e.g., utilizing processors commercially available from Intel Corporation of Santa Clara, Calif. or Advanced Micro Devices of Sunnyvale, Calif. Alternatively, embodiments in accordance with the present invention can be practiced on reduced instruction set computers (RISC) processors, e.g., as commercially available from International Business Machines Corporation of Armonk, N.Y., ARM Holdings, of Cambridge, England and SPARC based systems such as those commercially available from Sun Microsystems of Santa Clara, Calif.

Further, embodiments in accordance with the present invention can be practiced on a variety of operating systems, for example, real time operating systems and general purpose operation systems e.g., as commercially available from International Business Machines Corporation of Armonk, N.Y., Apple Computer, Inc. of Cupertino, Calif., Microsoft Corporation of Redmond, Wash., and from Sun Microsystems of Santa Clara, Calif.

Computer system resources can be allocated to a set of workloads operating on the computer system. As discussed previously, such resources can include physical memory, virtual memory, central processing unit (CPU) time, input/output (I/O) space or network bandwidth and the like. Generally, the allocation of these resources limits a particular workload to utilizing a maximum amount or "cap" of a particular resource. Moreover, management of these resources, individually or in an aggregation, is contemplated within various embodiments of the present invention.

In order to manage such limits on resource usage by a workload, the resource usage of the workload should be monitored. Such monitoring itself consumes computer system resources, for example, central processing unit time and physical memory. In accordance with embodiments of the present invention, a process within user space monitors and/or manages the resource usage of that workload. In accordance with other embodiments of the present invention, a process within a particular workload can monitor or manage the resource usage of that workload. In accordance with other embodiments of the present invention, such workload monitoring can be performed only when a workload is utilizing a portion of the workload's allocated resources.

In accordance with still other embodiments of the present invention, a workload resource monitoring process operating within user space or the workload can identify and/or determine which resources should be reassigned, e.g., taken away from the workload. In accordance with yet other embodiments of the present invention, a process can be initiated within a workload to initiate the reassignment of resources away from the workload.

Figure 1:
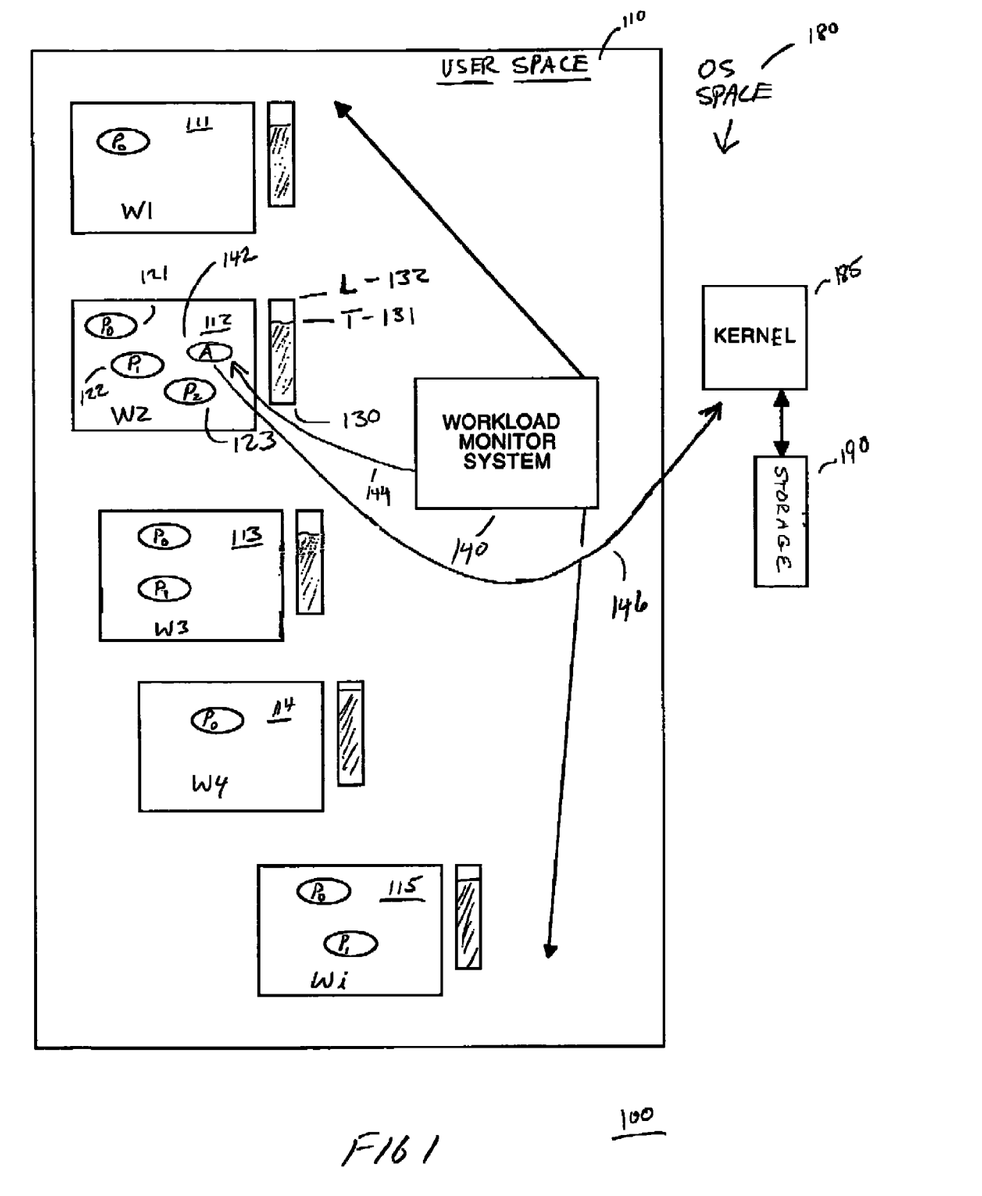
FIG. 1 illustrates elements of a computer system, in accordance with embodiments of the present invention.

FIG. 1 illustrates elements of a computer system 100, in accordance with embodiments of the present invention. Computer system 100 comprises an operating system (OS) space 180. Operating system space 180 comprises an operating system kernel 185 and storage 190. Operating system space 180 can also comprise other well-known resources utilized and/or controlled by the operating system, not shown. In general, operating system space 180 is limited to a minimum set of aspects of computer system 100 required for operating system functionality. It is to be appreciated that embodiments in accordance with the present invention are well suited to other divisions of user space versus operating system space.

Computer system 100 further comprises user space 110. In general, user space 110 comprises all system resources not specifically included in operating system space 180. User space 110 comprises a plurality of workloads, e.g., workloads 111-115. It is to be appreciated that embodiments in accordance with the present invention are well suited to more or less workloads. Each workload can comprise a plurality of processes, e.g., processes 121-123 of workload 112. Typically, each workload is allocated resources, e.g., physical memory or central processing unit (CPU) time, to utilize. Physical memory utilization of a workload, e.g., workload 112, can be tracked, e.g., by physical memory utilization gauge 130. Physical memory utilization gauge 130 can track physical memory usage as a ratio of an assigned physical memory cap or limit. For example, limit 132 may represent a physical memory cap for workload 112.

A resource cap, e.g., a physical memory cap, can be "hard" or "soft." Violations of a "hard" cap should always initiate corrective action(s), e.g., paging out physical memory utilized by a workload. Violation of a "soft" cap may or may not initiate corrective action(s). For example, even if a workload exceeds a soft cap on physical memory usage, a corrective action may not be initiated if there is sufficient system physical memory available for all workloads. Such soft caps can allow systems with underutilized resources to operate more efficiently. Alternatively, for example, a soft cap can initiate corrective action(s) if system physical memory is overcommitted.

In accordance with embodiments of the present invention, certain actions associated with workload memory monitoring, e.g., more frequent monitoring and/or paging out, can be initiated at a threshold level, e.g., threshold level 131 for workload 112, that is less than a physical memory cap for that workload.

Workload monitor system 140 is a process operating within user space 110. According to one embodiment in accordance with the present invention, workload monitor system 140 is separate from other workloads, e.g., workloads 111-115. In accordance with other embodiments of the present invention, workload monitor 140 is a part of a monitored workload. Workload monitor system 140 monitors memory usage of a plurality of workloads. Workload monitor system 140 determines if physical memory usage of a workload exceeds a capacity limit, e.g., limit 132, or if memory usage exceeds a threshold level, e.g., threshold level 131. In response to such a determination, a corrective action can be taken. It is to be appreciated that other factors, e.g., "hard" versus "soft" caps, other system characteristics and the like can be considered in determining whether to initiate a corrective action and/or what action to initiate.

If a determination is made to page out physical memory assigned to a workload, workload monitor system 140 determines a plurality of pages, e.g., least recently used pages, of the workload to be paged out. Workload monitor system 140 then initiates a process in user-space, e.g., within the workload or elsewhere in user-space, to cause the plurality of pages to be paged out. It is appreciated that typical operating systems enforce restrictions such that a first workload in user space cannot affect another workload. For example, a first workload cannot directly cause memory resources belonging to a second workload to be paged out. Initiating a process within a target workload can overcome such restrictions.

In accordance with an embodiment of the present workload, the process initiated in the target workload can be an "Agent LWP" process, as described in U.S. Pat. No. 6,002, 870, entitled "Method and Apparatus for Non-Damaging Process Debugging via an Agent Thread." An agent lightweight process (LWP) is a special type of lightweight process that can be created in a target programmed-process by a controlling programmed-process. Non-agent lightweight processes in a programmed-process are stopped while an agent lightweight process exists in the programmed-process. Creation of an agent LWP process allows a controlling process to control execution of computer instructions within a target process without co-opting an existing lightweight process in the target process. For example, an agent LWP operating within a workload is generally not restricted by an operating system from requesting the paging of pages assigned to its workload.

For example, if workload 112 exceeds its allowed physical memory cap, workload monitor system 140 can determine that some number of pages assigned to workload 112 shall be paged out to storage 190, to free up those pages for other workloads. Workload monitor system 140 creates 144 agent 142 within the target workload 112. Agent 142 can execute an operating system call 146 to kernel 185 requesting that particular pages assigned to workload 112 be paged out. In this novel manner, the workload itself initiates a paging out, or removal, of pages assigned to the workload.

In accordance with embodiments of the present invention, a workload monitor, e.g., workload monitor system 140 can track physical memory usage in at least two levels of monitoring "intensity." A first level of monitoring intensity can comprise tracking physical memory usage in comparison to a physical memory cap for each workload. A second level of monitoring intensity can additionally comprise determining least recently used physical memory pages assigned to a workload. It is to be appreciated that such a second level of monitoring intensity can consume greater compute resources than the described first level of monitoring intensity. A workload monitor can switch from a first level of monitoring intensity to a second level of monitoring intensity in response to a workload exceeding a trigger level of physical memory usage, e.g., threshold level 131. In this manner, a workload monitor can consume a lesser amount of computing resources when workloads are not "close" to a physical memory cap. When a workload approaches a physical memory cap, a workload monitor may require additional computing resources, e.g., to determine least recently used physical memory pages, in preparation for a possible paging out of physical memory assigned to the workload.

In accordance with embodiments of the present invention, some tasks of the previously described workload monitor system can be performed within a target workload. For example, determining least recently used physical memory pages of a workload can be performed by a process within the workload.

In accordance with embodiments of the present invention, significant benefits in scalability and efficiency of an operating system can be obtained by monitoring physical memory usage of a workload from within the workload, e.g., as a process utilizing computing resources assigned to that workload. A physical memory usage monitor can be established within each workload. As a consequence, every workload can be monitored. Alternatively, a physical memory usage monitor can be established for only some workloads. For example, if a workload's physical memory usage is below 50 percent of a physical memory limit for that workload, it can be beneficial to not establish a physical memory usage monitor in that workload. In this manner, computing resources dedicated to physical memory usage monitoring can be adjusted to optimize computer system performance.

In addition, since physical memory usage monitoring is not an operating system kernel process, physical memory usage monitoring can be implemented with diminished impact. For example, an operating system kernel-based process generally performs its function very frequently in comparison to non-kernel processes, e.g., every time the kernel is active. Implementing physical memory usage monitoring outside of a kernel enables the physical memory usage monitoring to operate less frequently, consuming fewer computing resources. Further, when a physical memory usage monitor is established in response to a workload approaching or exceeding a memory limit, only that workload is burdened by the computing requirements of the physical memory usage monitor and the overall burden of monitoring is reduced in comparison to a constant monitoring method.

A workload is typically assigned a set of virtual memory pages by an operating system. Processes, tasks and the like within the workload can request more virtual memory pages from the operating system. Such processes and tasks can also relinquish virtual memory pages back to the operating system. An operating system will generally maintain a list of virtual and physical memory pages assigned to a workload.

A physical memory usage process within a workload will generally have access to the list of physical memory pages assigned to its workload. Such a physical memory usage monitoring process can access the list and determine if a particular page on the list (and consequently assigned to the workload) has been accessed. A page access can comprise a read or write action to/from any portion of a page. A physical memory usage monitoring process can determine if each page in sequence, e.g., in the list order maintained by the operating system, has been accessed. By repeating such determination in sequence for each page, and treating the list as a circular queue, a physical memory usage monitoring process can determine if a page has been accessed since a last access determination was made for that page. In this manner, a physical memory usage monitor resident in user space can determine a plurality of pages assigned to a workload or a particular process that have been used least recently. This method provides an efficient technique to determine such least recently used pages. In general, it is desirable to page out such least recently used pages, as such pages are least likely to be required by subsequent processing.

Figure 2:
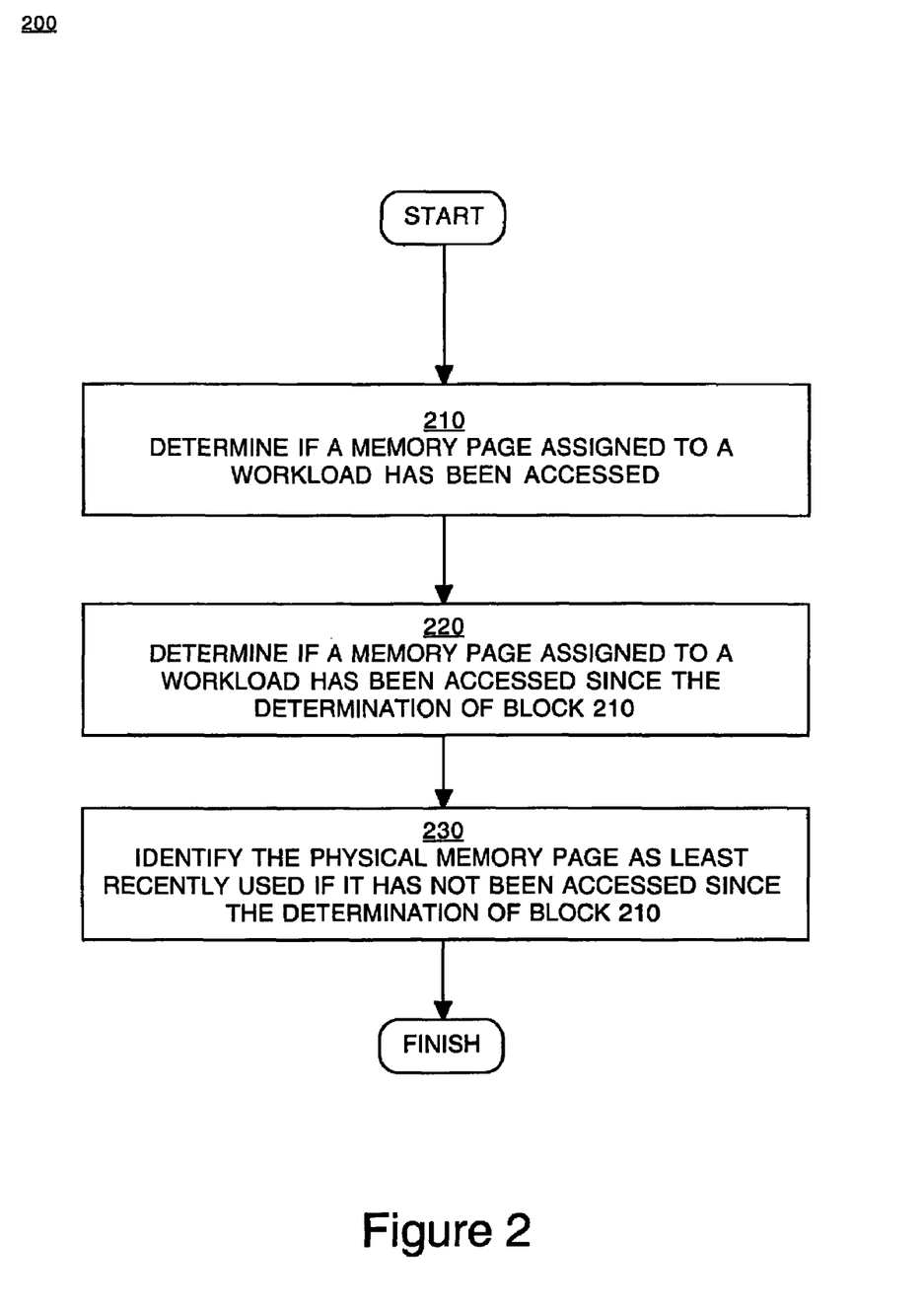
FIG. 2 illustrates a flow diagram of a computer implemented method of determining if a page has been accessed by a workload since a previous determination of whether said page had been accessed by said workload, in accordance with embodiments of the present invention.

FIG. 2 illustrates a flow diagram of a computer implemented method 200 of determining if a page has been accessed by a workload since a previous determination of whether said page had been accessed by the workload, in accordance with embodiments of the present invention.

In block 210, it is determined if a physical memory page assigned to a workload has been accessed. Subsequently, in block 220, it is determined if the physical memory page has been accessed since the determination of block 210. In optional block 230, the physical memory page is identified as least recently used if it has not been accessed since the determination of block 210.

Figure 3:
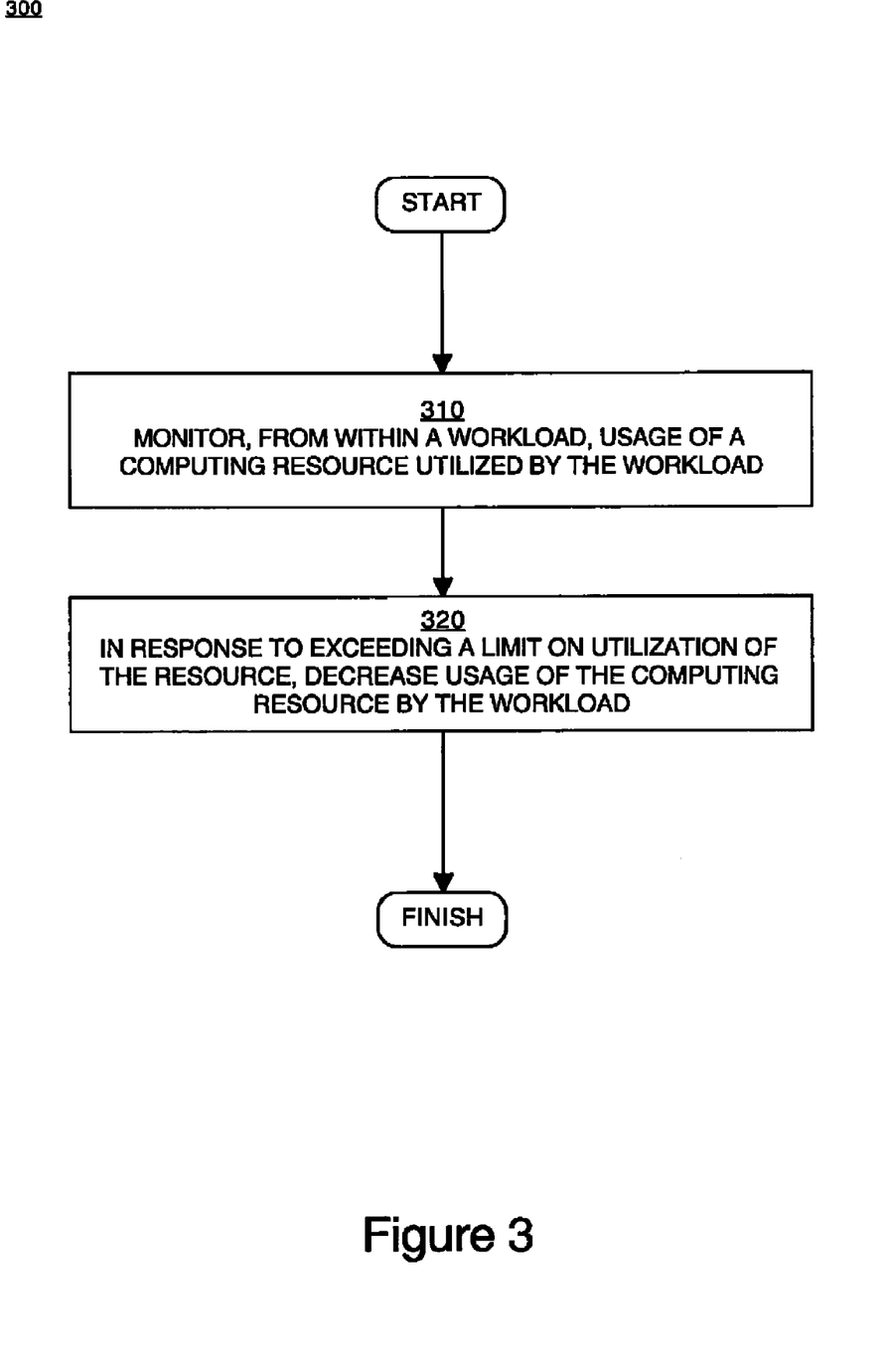
FIG. 3 illustrates a flow diagram of a computer implemented method, in accordance with embodiments of the present invention.

FIG. 3 illustrates a flow diagram of a computer implemented method 300, in accordance with embodiments of the present invention. In block 310, usage of a computing resource utilized by a workload is monitored from within the workload. Computer system resources can comprise, for example, physical memory, virtual memory, central processing unit (CPU) time, input/output (I/O) space or network bandwidth and the like.

In block 320, usage of the computing resource by the workload is decreased in response to exceeding a limit on utilization of the resource. The limit that triggers block 320 can be less than the maximum resource amount allowed to the workload. For example, to decrease resource usage, physical memory may be paged out to storage to decrease the amount of physical memory utilized by a workload. The physical memory paged out can be the page(s) least recently accessed by the workload.

In accordance with embodiments of the present invention, a process of decreasing usage of the computing resource should not halt operation of the workload. For example, under a conventional art method, a workload is halted and its physical memory is gradually paged out as that physical memory becomes the least recently used memory in the system. As a deleterious consequence, the workload is unresponsive for some period of time until it is granted physical memory once again. In contrast, the present method beneficially does not require a workload to be halted for a significant period of time. Without halting a workload, the process(es) of the workload may continue operation even as workload resources are decreased.

In accordance with an embodiment of the present workload, the process initiated in the target workload can be an "Agent LWP" process, as described in U.S. Pat. No. 6,002,870, entitled "Method and Apparatus for Non-Damaging Process Debugging via an Agent Thread." An "Agent LWP" can be created in the workload. The "Agent LWP" can then make an operating system call to cause identified pages of memory to be paged out. The agent LWP is capable of executing computer code in the target workload without disturbing partially completed operating system kernel (OSK) processes. For example, the rest of the workload can be suspended safely by placing other LWPs into a known state in the kernel while the agent executes. Thus, the original processes of the workload executes correctly when resumed.

In accordance with embodiments of the present invention, the monitoring of the present method should not comprise an operating system kernel process. For example, under a conventional art method, an operating system kernel process monitors usage of computing resources, e.g., memory, utilized by a workload. As a deleterious consequence, such an operating system kernel process consumes computing resources at a high rate in comparison to non-kernel processes. In contrast, the present method beneficially does not utilize operating system kernel processes.

Figure 4:
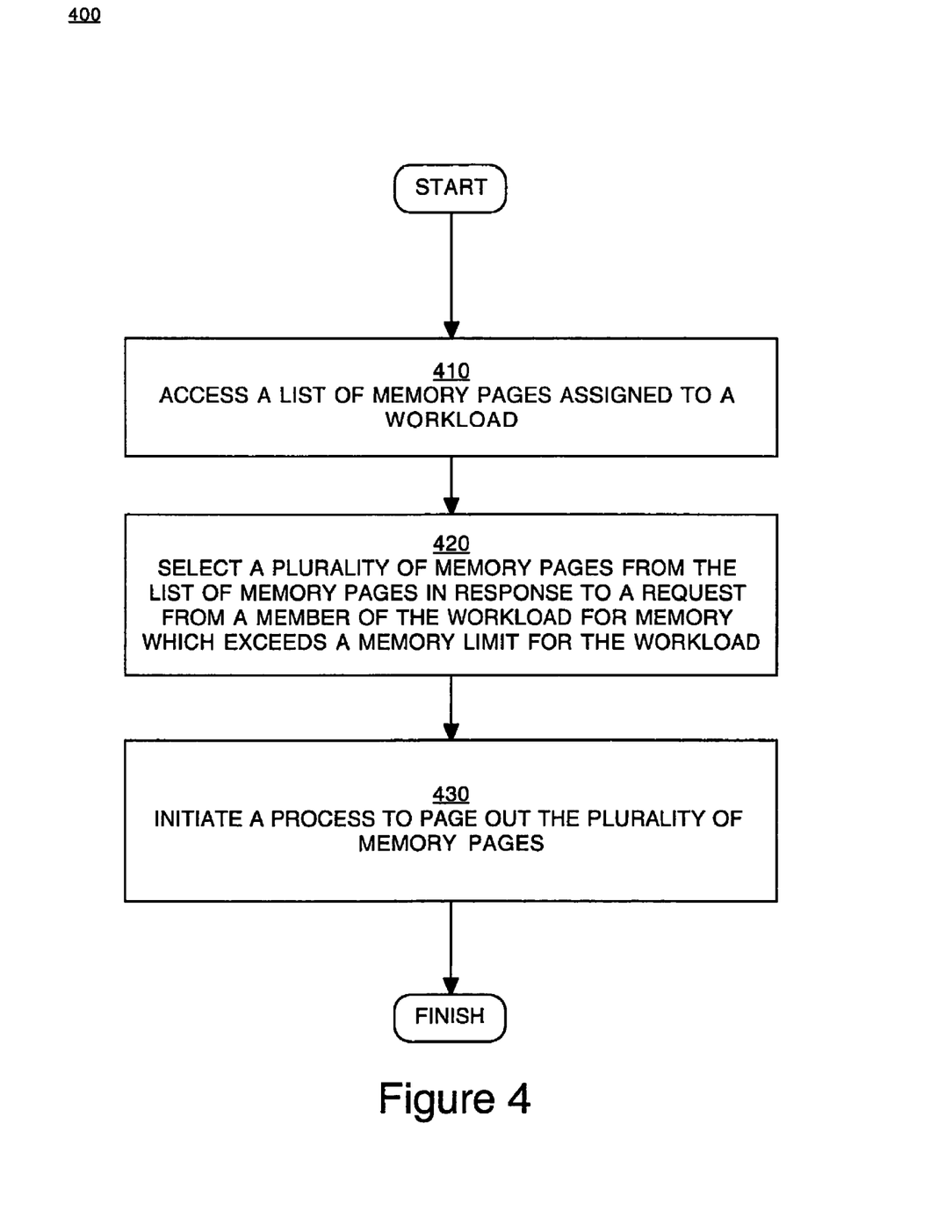
FIG. 4 illustrates a flow diagram of a computer implemented method, in accordance with embodiments of the present invention.

FIG. 4 illustrates a flow diagram of a method 400, in accordance with embodiments of the present invention. In block 420, a list of physical memory pages assigned to a workload is accessed. The list can, for example, be created and/or maintained by the operating system. However, the list should be accessed by a process, e.g., a resource usage monitor, executing within the workload.

In block 420, a plurality of physical memory pages from the list of memory pages is selected in response to a request from a member of the workload for memory that exceeds a physical memory limit for the workload. The selection should be performed by a process, e.g., a resource usage monitor, executing within the workload.

In accordance with embodiments of the present invention, the physical memory pages selected in block 420 can comprise physical memory pages least recently used. In general, least recently used pages are considered least likely to be needed. Consequently, selecting least recently used pages will generally have the least impact upon processes of the workload.

In accordance with embodiments of the present invention, the physical memory pages selected in block 420 can comprise a sufficient number of least recently used pages, e.g., the least recently used page and the second least recently used page, etc., so as to reduce the number of physical memory pages assigned to the workload to below the memory limit. Such number can be optimized to be the minimum number of pages to reduce the number of physical memory pages assigned to the workload to below the memory limit.

In block 430, a process is initiated to page out the plurality of physical memory pages. Paging out physical memory pages is typically an operating system function. However, generally an operating system provides a mechanism for a process within a workload to identify a set of pages and request the operating system to page such pages out. Such initiation should be performed by a process, e.g., a resource usage monitor, executing within the workload.

In accordance with an embodiment of the present workload, the process initiated in the target workload can be an "Agent LWP" process, as described in U.S. Pat. No. 6,002,870, entitled "Method and Apparatus for Non-Damaging Process Debugging via an Agent Thread." An "Agent LWP" can be created in the workload. The "Agent LWP" can then make an operating system call to cause identified pages of memory to be paged out.

In accordance with an embodiment of the present invention, at least a portion of the workload can continue to operate subsequent to the execution of block 430. Under some conventional art methods, a workload is halted when it exceeds a resource cap. While halted, its resources are recovered by the operating system. Unfortunately, the workload does not operate while halted, and is unresponsive. In contrast, the embodiments in accordance with the present invention are capable of reducing a workload's resource consumption while maintaining at least some operation of the workload, beneficially continuing operation and responding to actions of the computer system.

Figure 5:
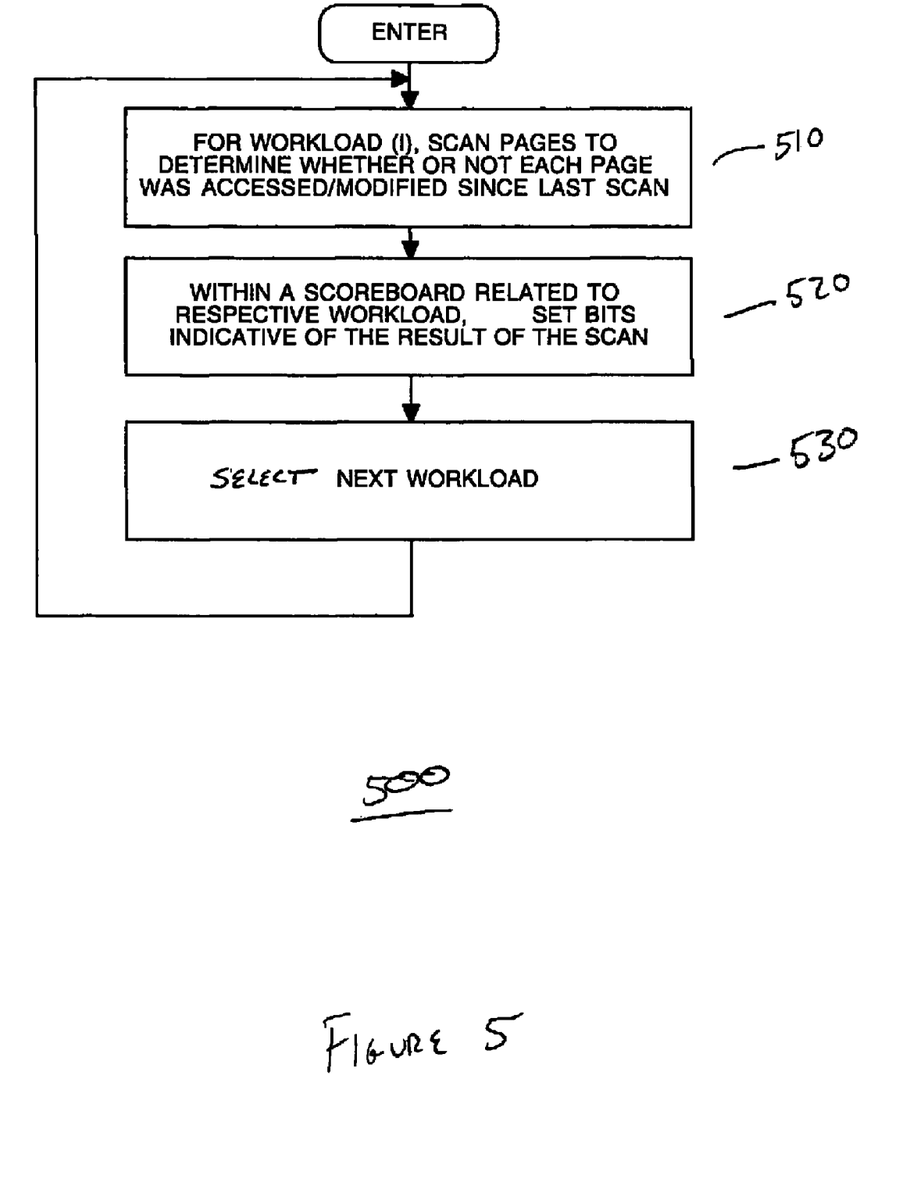
FIG. 5 illustrates a flow diagram of a computer implemented method, in accordance with embodiments of the present invention.

FIG. 5 illustrates a flow chart of a computer implemented method 500, in accordance with embodiments of the present invention. Method 500 should be, but is not required to be, performed across all workloads within a user space of a computer system. The workloads can be referred to by an index, i, for convenience of reference.

In block 510, pages of workload(i) are scanned to determine whether or not each page was accessed since a last scan. Typically, an operating system maintains such access information. It is to be appreciated that a modification of a page is considered an access to that page.

In block 520, bits are set indicative of the result of the scan within a scoreboard related to a respective workload.

In block 530, a next workload is selected. For example, the index is incremented modulo the number of workloads. Process flow then continues at block 510.

Figure 6:
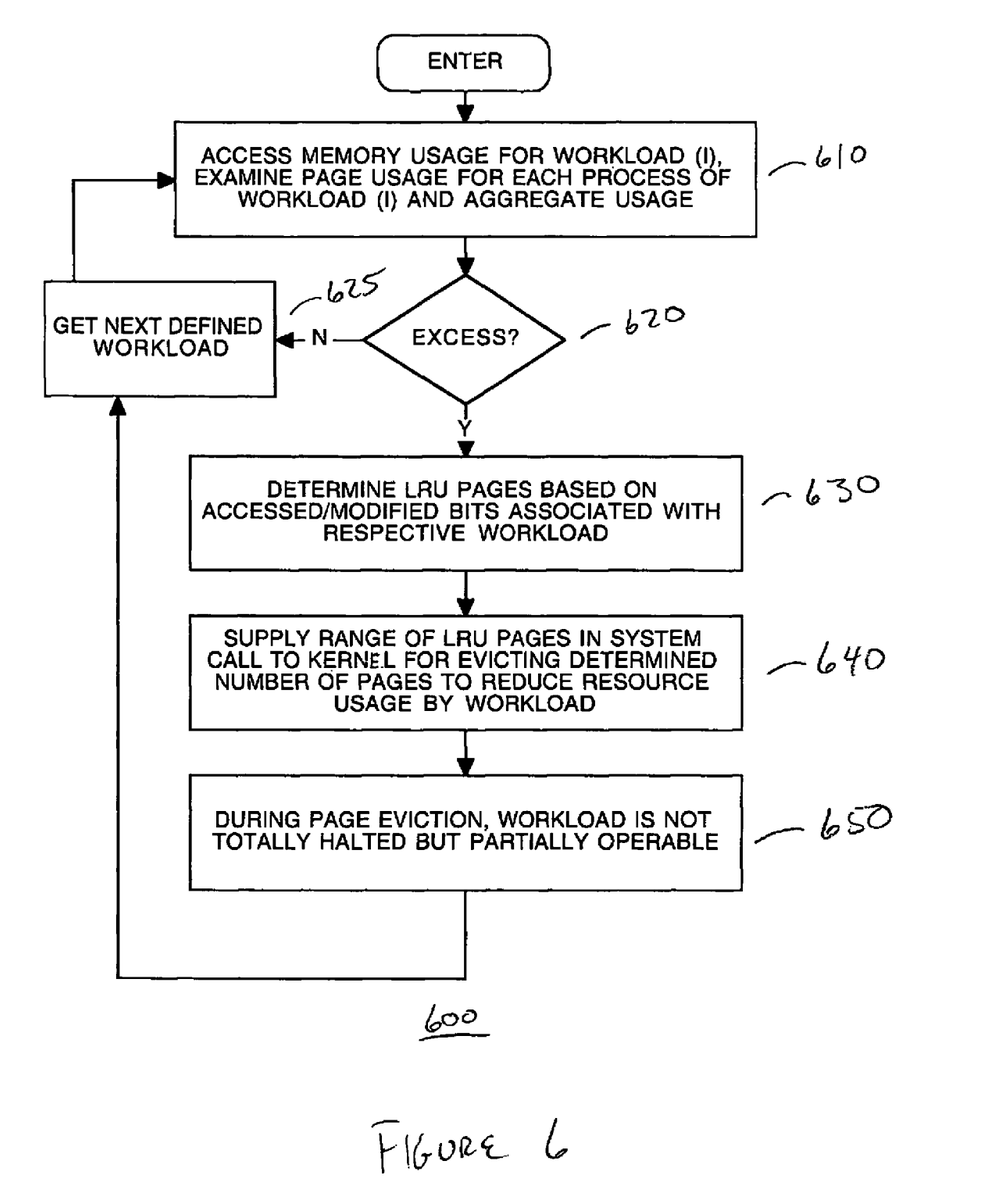
FIG. 6 illustrates a flow diagram of a computer implemented method, in accordance with embodiments of the present invention.

FIG. 6 illustrates a flow chart of a computer implemented method 600, in accordance with embodiments of the present invention. Method 600 should be, but is not required to be, performed across all workloads within a user space of a computer system. The workloads can be referred to by an index, i.

In block 610, memory usage for workload(i), e.g., a specific workload of a set of workloads, is accessed, and page usage for each process of workload(i) is examined and usage aggregated.

In block 620, physical memory usage is compared to an allowed limit. If physical memory usage is in excess of the limit, control transfers to block 630. If physical memory usage is not in excess of the limit, control transfers to block 625.

Block 625 can be entered from block 620 or from block 650. In block 625, the method gets the next defined workload, and control proceeds to block 610. When each workload's physical memory usage has been examined, the process repeats with the index advanced.

Block 630 is entered from block 620 in response to a determination that physical memory usage of a workload exceeds an allowed limit. In block 630, least recently used (LRU) pages are determined based on accessed/modified bits associated with the respective workload.

In block 640, a range of LRU pages is supplied in a system call to the kernel for evicting the determined number of pages to reduce resource usage by the workload.

In block 650, the workload is not totally halted but partially operable during page eviction.

Figure 7:
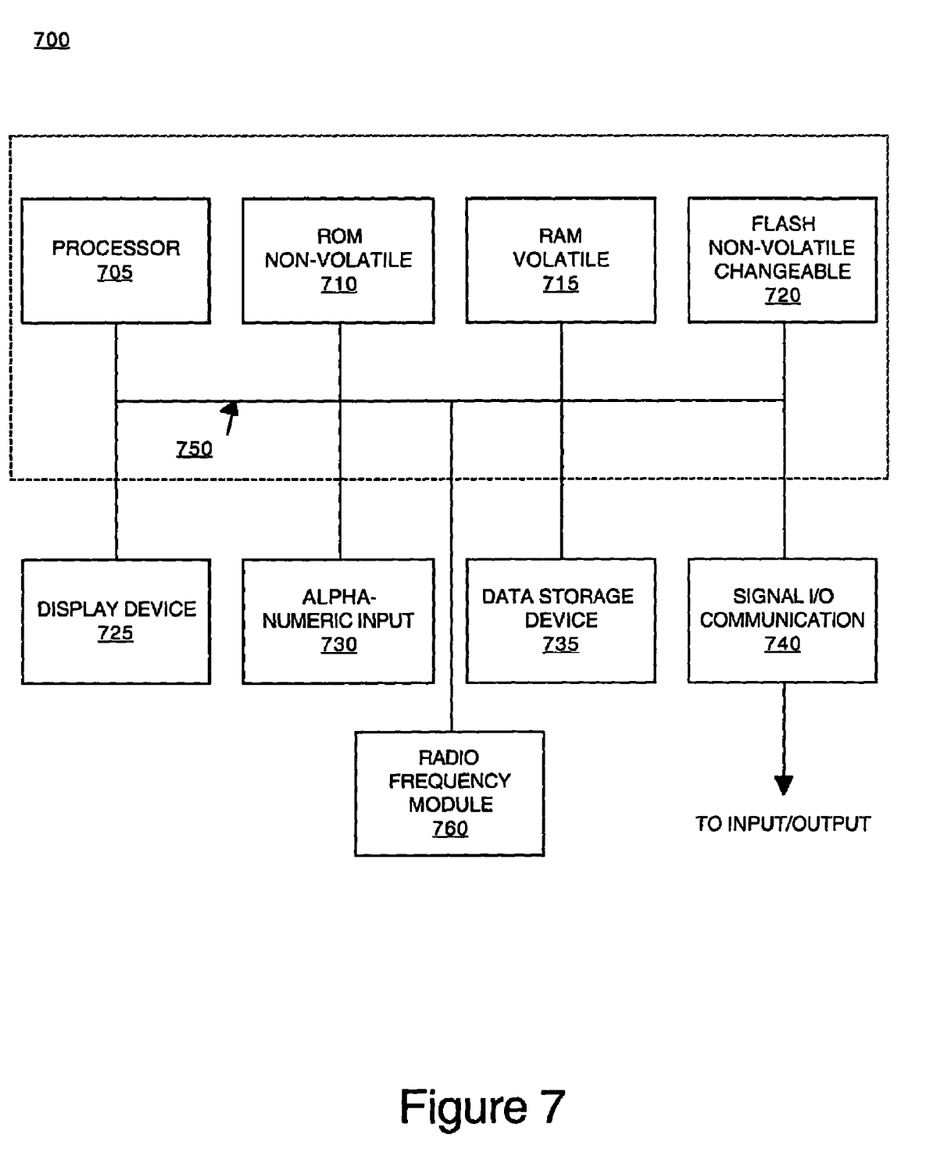
FIG. 7 is a block diagram of a computer system, which may be used as a platform to implement embodiments of the present invention.

FIG. 7 illustrates circuitry of computer system 700, which may form a platform for the implementation of embodiments of the present invention. Computer system 700 includes an address/data bus 750 for communicating information, a central processor 705 functionally coupled with the bus for processing information and instructions, a volatile memory 715 (e.g., random access memory RAM) coupled with the bus 750 for storing information and instructions for the central processor 705 and a non-volatile memory 710 (e.g., read only memory ROM) coupled with the bus 750 for storing static information and instructions for the central processor 705. Computer system 700 also optionally includes a changeable, non-volatile memory 720 (e.g., flash) for storing information and instructions for the central processor 705, which can be updated after the manufacture of computer system 700.

Computer system 700 also optionally includes a data storage device 735 coupled with the bus 750 for storing information and instructions.

Also included in computer system 700 of FIG. 7 is an optional alphanumeric input device 730. Input device 730 can communicate information and command selections to the central processor 705. Input device 730 may take the form of a touch sensitive digitizer panel or typewriter-style keyboard. Optional display device 725 utilized with the computer system 700 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user. Optional signal input/output communication device 740 is also coupled to bus 750. Device 740 may be a network interface card configured for various networks, either for the local area or for longer distances, including without limitation ethernet and token ring.

Computer system 700 optionally includes a radio frequency module 760, which may implement a variety of wireless protocols, for example IEEE 802.11 or Bluetooth.

It is to be appreciated that computer system 700 can comprise a computer system terminal or ultra thin client, and that such embodiments are within the scope of embodiments of the present invention. Additionally, one or more of the components of computer system 700 can be located remotely and accessed via a network.

Embodiments in accordance with the present invention, user-space resource management, are thus described. While the present invention has been described in particular embodiments, it should be appreciated that the present invention should not be construed as limited by such embodiments, but rather construed according to the below claims.

What is claimed is:

1. A computer implemented method comprising:
monitoring usage of a computing resource utilized by a workload wherein said monitoring is performed by a process within a user space and the process monitors the user space only, wherein said process is not an operating system kernel process; wherein the workload includes a plurality of running processes, the plurality of running processes are a subset of all processes that are running in the user space;
accessing a list of memory pages assigned to said workload in the user space; and
responsive to exceeding a limit on utilization of said computing resource, decreasing usage of said computing resource by said workload, said decreasing usage of said computing resource comprises paging a portion of said list of memory pages assigned to said workload out of said list of memory pages and said decreasing usage allows at least partial operation of said workload during said paging such that the at least partial operation does not stop said workload; wherein said portion of said list of memory pages comprises a least recently used portion of said list of memory pages assigned to said workload.

2. The method of claim 1 wherein said decreasing usage is initiated by a process of said workload.

3. A computer implemented method for memory management of a workload from within the workload comprising:
accessing a list of memory pages assigned to said workload in a user space, the workload includes a plurality of running processes, the plurality of running processes are a subset of all processes that are running in the user space;
responsive to a request from a first process of said workload for memory which exceeds a predetermined memory limit for said workload, selecting a plurality of memory pages from said list of memory pages, wherein the plurality of memory pages includes least recently used memory pages assigned to the workload, wherein the plurality of memory pages are least recently used by the workload; and
initiating a second process within the user space to page out said plurality of memory pages, wherein said second process is not an operating system kernel process, wherein at least a portion of said workload continues to operate subsequent to said initiating.

4. The method of claim 3 wherein said accessing, selecting and initiating are performed by said second process within said workload.

5. The method of claim 3 wherein said second process is loaded into a user space.

6. The method of claim 3 wherein said page out of said plurality of least recently used memory pages reduces a number of memory pages assigned to said workload to below said memory limit.

7. The method of claim 3 wherein said plurality of least recently used memory pages comprises the minimum number of memory pages to reduce said number of memory pages assigned to said workload below said memory limit.

8. The method of claim 3 wherein said initiating is not performed by an operating system kernel process.

9. A computer implemented method comprising:
accessing memory usage for a workload and examining page usage for each process of said workload, the workload exists within a user space and includes a plurality of running processes, the plurality of running processes are a subset of all processes that are running in the user space;
aggregating usage of said each process to determine an aggregate usage for said workload;
monitoring said memory usage for the workload by a process within the user space that is not an operating system kernel process;

if said aggregate usage does not exceed a memory utilization limit for said workload, repeating said accessing and aggregating for a next workload;

if said aggregate usage exceeds said memory utilization limit for said workload, determining least recently used pages by the workload based on accessed bits associated with said workload;

if said aggregate usage exceeds said memory utilization limit for said workload, supplying a range of the least recently used pages in a system call to an operating system kernel for evicting said range of the least recently used pages to reduce resource usage by said workload; and retaining at least partial operation of said workload during said page evicting such that the at least partial operation does not stop said workload.

10. The method of claim 9 wherein said determining and said supplying occur in a plurality of user space processes.

11. A computer implemented method of managing computer resources over a plurality of workloads, said method comprising:

for each workload of said plurality of workloads, monitoring respective workload resource usage against a respective allotment of each workload;

determining a range of computer resources to page out for each workload whose resource usage exceeds its respective allotment, wherein said determining comprises determining least recently used pages for each workload whose resource usage exceeds its respective allotment; and initiating a paging out operation of said range of computer resources and wherein said monitoring, said determining and said initiating all occur within a process of user space that is not an operating system kernel process, wherein each of the plurality of workloads exists within a user space and includes a plurality of running processes, the plurality of running processes are a subset of all processes that are running in the user space, and paging out said range of computer resources and wherein each workload whose resource usage exceeds its respective allotment remains partially operable during said paging out of its respective range of computer resources.

12. The method as described in claim 11 wherein said process is situated within a workload of said plurality of workloads.

* * * * *